H. BAGLEY.
Corn-Planters.
No. 158,352. Patented Jan. 5, 1875.
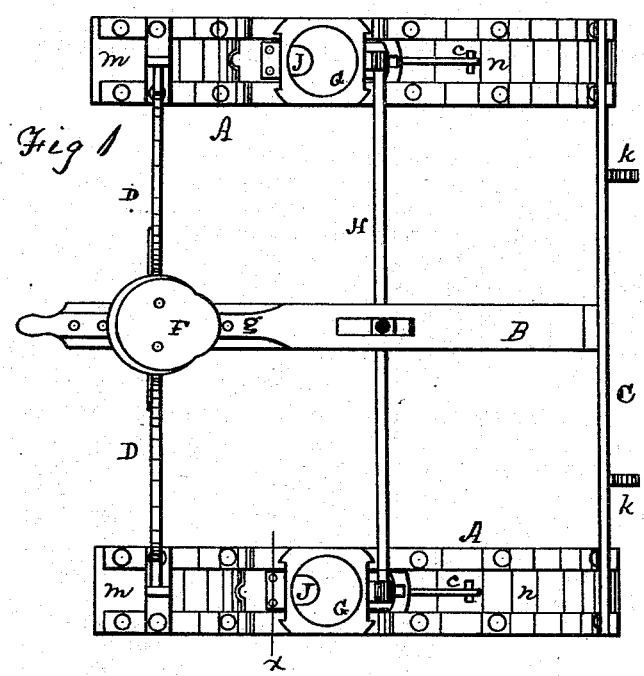
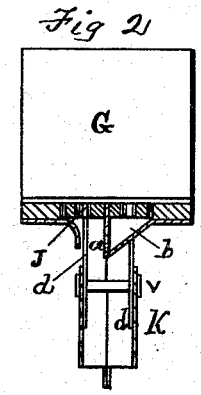
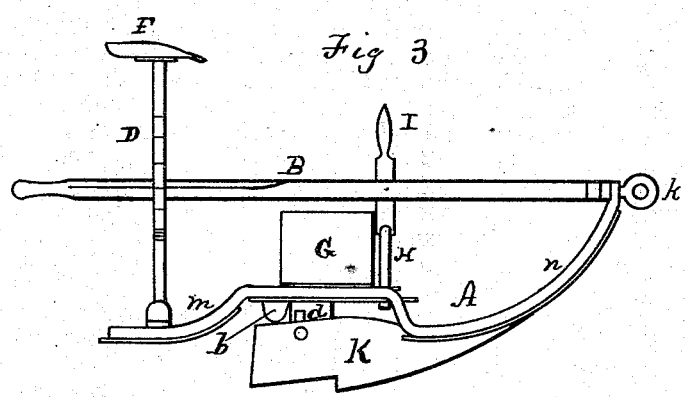
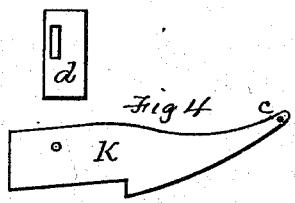
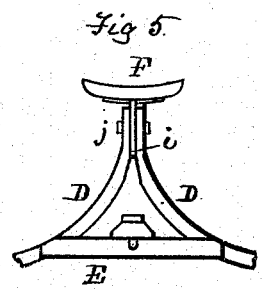
Witnesses
E. A. West
O. W. Bond
Henry Bagley
Inventor

UNITED STATES PATENT OFFICE.

HENRY BAGLEY, OF MECHANICSVILLE, IOWA.

IMPROVEMENT IN CORN-PLANTERS.

Specification forming part of Letters Patent No. 158,352, dated January 5, 1875; application filed September 16, 1874.

*To all whom it may concern:*

Be it known that I, HENRY BAGLEY, of Mechanicsville, in the county of Cedar and State of Iowa, have invented new and useful Improvements in Corn-Planters, of which the following is a full description, reference being had to the accompanying drawings.

Figure 1 is a top or plan view; Fig. 2, an enlarged section at $x$ of Fig. 1; Fig. 3, a side view; Fig. 4, a detail showing the opener and ear detached; Fig. 5, a detail, being a rear view of the parts shown.

The object of my invention is to construct a corn-planting machine which shall be wholly mounted on runners, and be cheap, simple, durable, and efficient; and it consists in a peculiar construction and operation of the seed-dropping devices, and in an improved device for adjusting the weight of the driver to the machine.

In the drawings, A represents the runners; B, the central bar, on which the driver's seat is placed, and also a seat for the dropper; C, the front cross-bar, with which the tongue is connected; D D, bar or bars supporting the driver's seat. They are bent down at their outer ends, and pivoted or hinged to the rear ends of the runners, to permit the driver's seat to be moved forward or backward, as may be necessary, to adjust the driver's weight to the machine. E is a short cross-bar placed just below the bar B. Its ends are attached to D D, and it is used for adjusting and holding the driver's seat in position, which can be done by means of a pin passing through the two bars B E, holes $g$ being provided. F is the driver's seat; G G, the seed-hoppers; H, bar or rod for operating the seed-slides; I, handle by which this bar or rod is operated. J is the seed-slide, to the under side of which is attached a small partition-plate, $a$, which, with the cup-shaped plate or piece $b$, which is stationary, forms a seed-cup when the seed-slide is pushed back as far as it can go. The seed-slide has two holes parallel with each other, each of which receives the corn for a hill.

When the seed-slide is pushed back, the corn from one hole falls directly to the ground, and from the other into the seed-cup $b$. Then, when the seed-slide is moved forward, the partition $a$ will be carried away from the cup-shaped plate $b$, and the corn in this cup will be released and fall to the ground.

K is the furrow-opener. Its forward end is pivoted to the runner at $c$, and the rear end is so connected with the machine that it can be raised or lowered to regulate the depth to which it shall enter the ground. This can be done by securing to that part of the runner which is away from the ground (the central portion) an ear, $d$, having in it a slot, the runner being secured to this ear by means of a bolt and nut, $v$. Two ears can be used for each runner. The driver's seat can be adjusted horizontally by means of a plate and bolt, $i j$. The forward movement of the seed-slide can be limited by means of a stop. Suitable foot-rests can be provided both for the driver and the party who operates the seed-slides. I attach the tongue loosely to the bar C at $k k$. The central parts of the runners are curved up away from the ground, and the forward and rear portions of the runners limit the depth to which the furrow-openers can enter the earth, and this depth will be uniform after the runners have been once adjusted. The seed-boxes are so near the ground that the corn can be dropped without using a second set of valves located, as usual, near the bottom of a seed-tube. The movement of the seed-slides is not transverse, as usual; and corn being dropped from the rear of the seed-boxes, and not from a close tube, the operation can be watched both by the driver and the dropper.

The machine is so constructed and balanced that, if the driver leave his seat and stand upon B, near the front of the machine, the rear end will be elevated, lifting the furrow-openers nearly, if not entirely, out of the ground, in which position the machine can be easily turned around.

I propose to make the runners by the use of two side-bars for each runner, properly bent, and faced with steel, extending from one bar to the other; but they may be cast or made in other suitable manner, and may be about four feet long and eight inches wide. As represented, each runner has a bearing-surface in front, and also in the rear, while the central portion is carried up away from the ground, and on this elevated portion the seed-boxes are located, and the furrow-opener is placed between the two parts *m n* of the runner. In effect there are two runners on each side of the machine, and the two parts *m n* of each runner might be made independent of each other, in which case there would be, in fact, two runners on each side, as there are now in effect.

The front part of the runner pulverizes and prepares the ground. The furrow-opener is so supported in front and rear that it enters the ground at a uniform depth, and the rear part of the runner covers the seed uniformly.

The outer ends of the bars D are to be so connected with the rear ends of the runners as to hold them in the proper position, taking the place of an independent cross-bar for that purpose. These bars D can best be made of iron. The front bar C can be of wood.

If the runners came in contact with the ground at all points and at the sides of the openers, the earth would pack about the openers, and their operation be interfered with. This difficulty is overcome by carrying the central portion up away from the ground, or by placing two runners on each side, one in front and the other in the rear of the openers, as before mentioned.

What I claim as new, and desire to secure by Letters Patent, is as follows:

1. The seed-slide J, having a plate or partition upon the under side, in combination with the stationary cup-shaped piece *b*, substantially as and for the purposes specified.

2. The bar or bars D D, loosely connected with the runners A A, in combination with the bar B and seat F, all constructed and operating substantially as and for the purposes specified.

HENRY BAGLEY.

Witnesses:
  E. A. WEST,
  O. W. BOND.